(12) United States Patent  
Osada

(10) Patent No.: US 9,571,693 B2  
(45) Date of Patent: Feb. 14, 2017

(54) IMAGE PROCESSING APPARATUS, IMAGE PROCESSING METHOD, AND PROGRAM

(71) Applicant: CANON KABUSHIKI KAISHA, Tokyo (JP)

(72) Inventor: Tomoaki Osada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/482,984

(22) Filed: Sep. 10, 2014

(65) Prior Publication Data

US 2015/0070729 A1    Mar. 12, 2015

(30) Foreign Application Priority Data

Sep. 12, 2013    (JP) .................................. 2013-189450

(51) Int. Cl.
*G06K 15/00* (2006.01)
*H04N 1/38* (2006.01)
*H04N 1/00* (2006.01)
*H04N 1/23* (2006.01)

(52) U.S. Cl.
CPC ............ *H04N 1/38* (2013.01); *H04N 1/00015* (2013.01); *H04N 1/00039* (2013.01); *H04N 1/00068* (2013.01); *H04N 1/233* (2013.01); *H04N 1/2307* (2013.01); *H04N 2201/0094* (2013.01)

(58) Field of Classification Search
CPC ... H04N 1/38; H04N 1/00015; H04N 1/00039
See application file for complete search history.

(56) References Cited

U.S. PATENT DOCUMENTS

| 2005/0094208 | A1  |  5/2005 | Mori |
| 2005/0243372 | A1* | 11/2005 | Sato et al. ................... 358/1.18 |
| 2009/0230606 | A1* |  9/2009 | Yokomizo .................. 270/52.03 |
| 2012/0147406 | A1* |  6/2012 | Yamaneki .......... H04N 1/00217 358/1.13 |
| 2012/0176634 | A1* |  7/2012 | Sano ........................... 358/1.12 |

FOREIGN PATENT DOCUMENTS

| JP | 2005-027088 A | 1/2005 |
| JP | 2005-254527 A | 9/2005 |
| JP | 2007-074270 A | 3/2007 |
| JP | 2010-178377 A | 8/2010 |

* cited by examiner

*Primary Examiner* — Marivelisse Santiago Cordero
*Assistant Examiner* — Kevin Ky
(74) *Attorney, Agent, or Firm* — Canon USA Inc., IP Division

(57) ABSTRACT

An image processing apparatus includes a determination unit configured to determine whether image data obtained by reading an input original is a blank sheet, a designation unit configured to designate a page position of the image data to designate a page position in which an insertion sheet is inserted in a printed matter obtained as a result of printing the image data, and a control unit configured to perform control so that image data printed in a sheet of a page next to an insertion sheet inserted in the page position designated by the designation unit in a case where blank-sheet skip printing is instructed, and image data printed in a sheet of a page next to the insertion sheet inserted in the page position designated by the designation unit in a case where the blank-sheet skip printing is not instructed, are the same image data.

6 Claims, 19 Drawing Sheets

FIG.11

| 8 | 20 | 25 | 34 |

1100

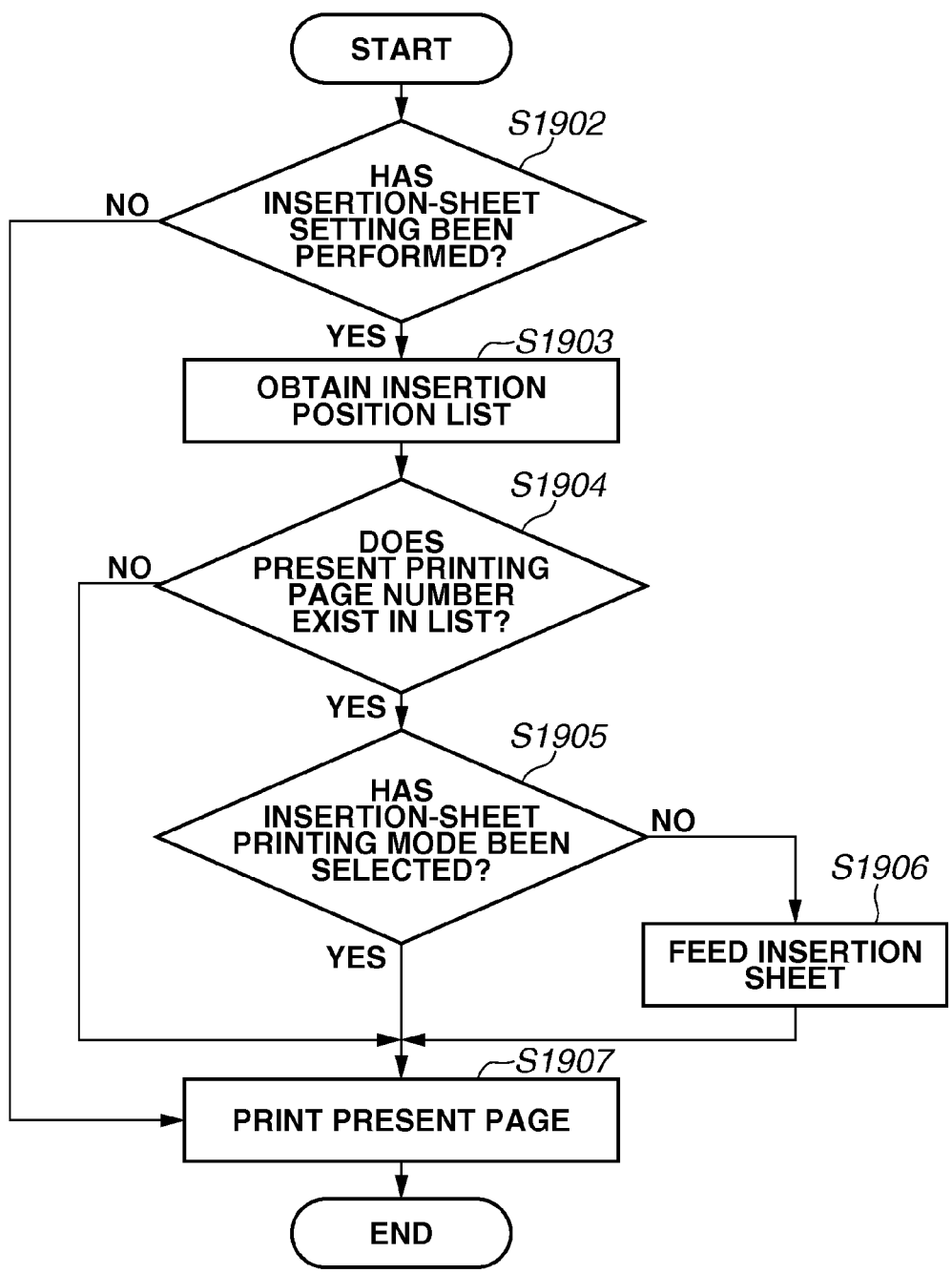

IMAGE PROCESSING APPARATUS, IMAGE PROCESSING METHOD, AND PROGRAM

BACKGROUND OF THE INVENTION

Field of the Invention

The present invention relates to an image processing apparatus that determines whether read image data is image data having printing information or image data of a blank sheet having no printing information.

Description of the Related Art

At the time of reading an original by an image reading apparatus such as a digital copying machine, there is a skimming-through method for reading an image while feeding the original by an auto document feeder (ADF) in a state where the position of an optical system is fixed.

Conventionally, in a copying machine with an auto document feeder, even when an original whose both sides are printed and an original whose one side is printed are mixed, both sides are read.

In this method, however, the blank face of the back side of the original whose one side is printed is also read. As a result, by reading the blank sheet having no printing information, unnecessary data is processed. Consequently, wasteful sheet consumption and power consumption occur. To address the problem, Japanese Patent Application Laid-Open No. 2010-178377 discusses a technique of suppressing useless printing and wasteful consumption of a sheet and toner by eliminating image data of a blank sheet determined by using a blank-sheet detection function of detecting whether a read original is a blank sheet having no printing information.

Japanese Patent Application Laid-Open No. 2010-178377 discusses a blank-sheet determination method for detecting an edge part in image data read from an original and determining whether the original is a blank sheet having no printing information, from the ratio of the detected edge amount to the number of pixels of a whole page.

Japanese Patent Application Laid-Open No. 2005-27088 discusses a method for stopping output when a blank sheet is detected in the case of copying an original by using the technique of blank-sheet detection. According to Japanese Patent Application Laid-Open No. 2005-27088, when a page including image data determined as a blank sheet is detected in a process for reading an image of an original, printing of the page is stopped, and the stop is notified to the user. By the method, unnecessary printing of a blank sheet is prevented (hereinbelow, called a blank-sheet skip printing function).

On the other hand, a digital copying machine in recent years has a sheet insertion function of inserting a divider sheet or interleaving paper. When the function is used, a color sheet, a tub sheet, or the like can be inserted in a position desired by the user in a printed matter, so that the value addition of the output matter can be increased. When the user designates an insertion position, a common method is designating a page number. For example, the insertion position (page) is designated by a designation method such as "before fourth page" in a printed matter. When the user desires to insert an insertion sheet in a plurality of places, a plurality of pages is designated. It is also possible to determine whether an image of an original is copied to an insertion sheet. For example, when an insertion sheet is not included in advance in an original, a mode of "not printing in an insertion sheet" is selected. In this case, a blank insertion sheet (having no printing information) is inserted. On the contrary, when an insertion sheet is included in an original, a mode of "printing in an insertion sheet" is selected. In this case, an original image is copied also to the insertion sheet.

However, in the case of simultaneously using the blank-sheet skip printing function and the insertion sheet function, a problem occurs such that the insertion position of an insertion sheet designated by the user is changed. As described above, the insertion position of an insertion sheet is instructed by designating a page number in a printed matter. However, when a blank sheet page is skipped without printing the blank-sheet, the page number in an output printed matter is changed, and the relative insertion position of an insertion sheet is changed. Further, a problem occurs also with respect to the mode of "printing in an insertion sheet". When an insertion sheet having no printing information, such as a blank sheet or a color sheet, is inserted in an original, if the page is determined as a blank sheet and printing is skipped by the blank-sheet skip printing function, an image which is not originally an insertion sheet is handled as an insertion sheet, and a printing result which is not desired by the user is obtained.

SUMMARY OF THE INVENTION

According to an aspect of the present invention, an image processing apparatus includes a determination unit configured to determine whether image data obtained by reading an input original is a blank sheet, a designation unit configured to designate a page position of the image data to designate a page position in which an insertion sheet is inserted in a printed matter obtained as a result of printing the image data, and a control unit configured to perform control so that image data printed in a sheet of a page next to an insertion sheet inserted in the page position designated by the designation unit in a case where blank-sheet skip printing is instructed in which image data determined as a blank sheet by the determination unit is not printed and image data determined as a non-blank sheet by the determination unit is printed, and image data printed in a sheet of a page next to the insertion sheet inserted in the page position designated by the designation unit in a case where the blank-sheet skip printing is not instructed, are the same image data.

According to the present invention, even in the case of simultaneously using the blank-sheet skip printing function and the insertion sheet function, a printing result desired by the user can be obtained.

Further features of the present invention will become apparent from the following description of exemplary embodiments with reference to the attached drawings.

BRIEF DESCRIPTION OF THE DRAWINGS

FIG. 11 is a diagram illustrating an example of an insertion sheet insertion position list.

FIG. 19 is a flowchart illustrating the flow of page printing.

DESCRIPTION OF THE EMBODIMENTS

Various exemplary embodiments, features, and aspects of the invention will be described in detail below with reference to the drawings.

<Outer Appearance of Copying Machine>

Figure 1:
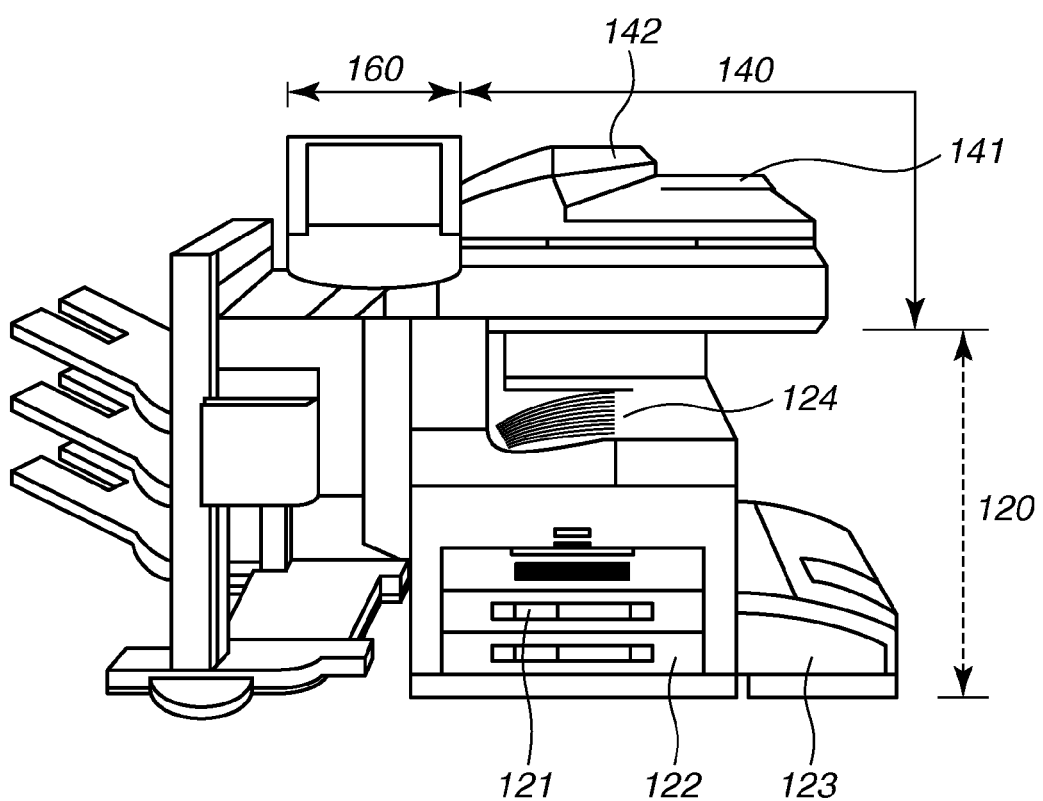
FIG. 1 is a diagram illustrating an outer appearance example of a copying machine.

FIG. 1 is a diagram illustrating an outer appearance example of a copying machine as an image processing apparatus.

A scanner unit 140 as an image reading unit scans and exposes an original to light generated by an illumination lamp. The reflected light is input to a linear image sensor (CCD sensor) to convert information of the image to an electric signal. The scanner unit 140 further converts the electric signal to a luminance signal made of R, G, and B colors and outputs the luminance signal as image data to a controller 200 in FIG. 3 which will be described below.

The original is set in a tray 142 of an original feeder 141. When the user instructs to start reading through an operation unit 160, the controller 200 sends an instruction for reading the original to the scanner unit 140. On receipt of the instruction, the scanner unit 140 performs an original reading operation by feeding originals one by one from the tray 142 of the original feeder 141 (hereinbelow, this operation mode will be called a skimming-through mode). An original can be also read when placed on a platen glass which will be described below.

A printer 120 is an image forming device for forming on a sheet an image of the data received from the controller 200.

The image formation method in the exemplary embodiment is of an electrophotographic method using a photosensitive drum and photosensitive belt. The printer 120 has a plurality of sheet cassettes 121, 122, and 123 which can be adapted to different sheet sizes and different sheet orientations. To a sheet discharge tray 124, a printed sheet is discharged.

<Scanner Unit in Copying Machine>

Figure 2:
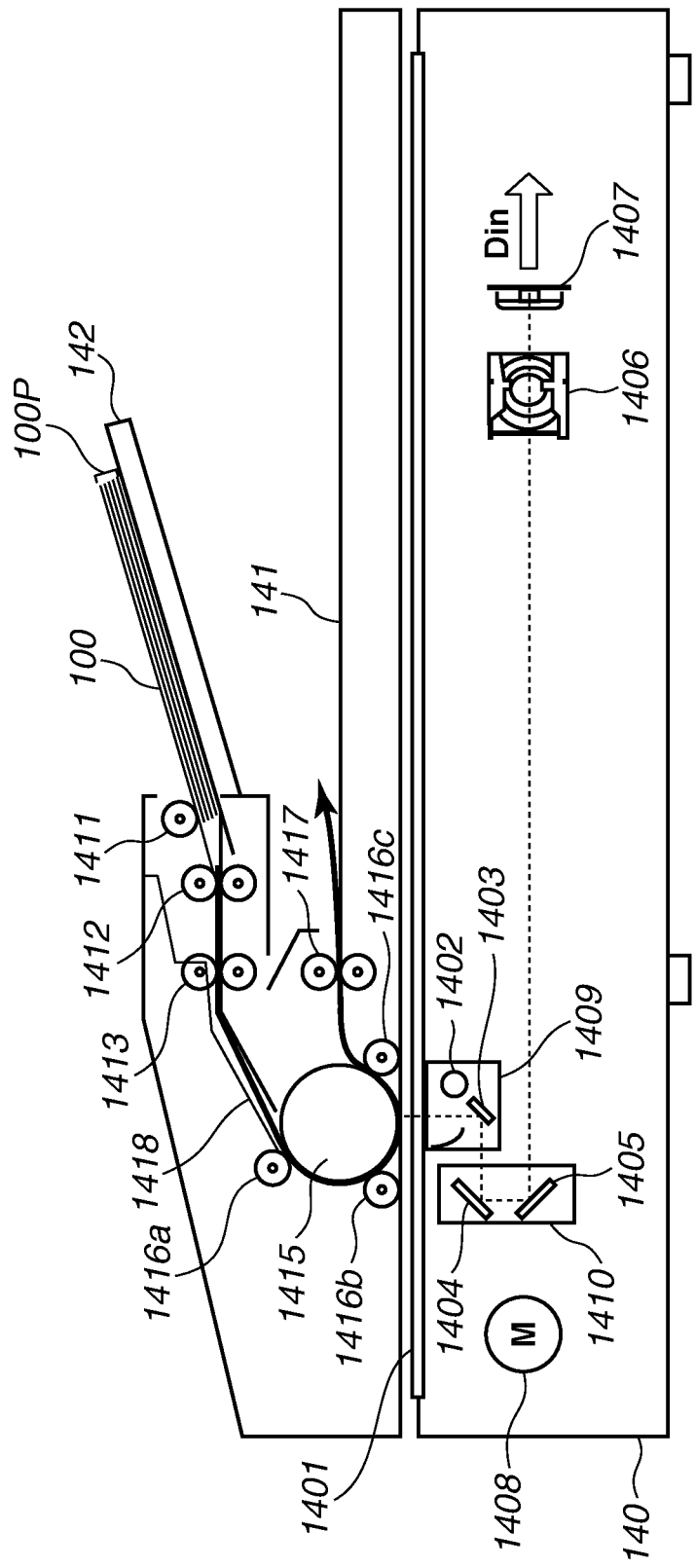
FIG. 2 is a diagram illustrating a structure example at the time of a skimming-through operation of a scanner unit.

FIG. 2 is a schematic diagram illustrating a main configuration and a reading operation of the scanner unit 140 using a linear image sensor in the exemplary embodiment. Specifically, FIG. 2 illustrates the main configuration and outline of the reading operation in the case of "skimming-through" an original by operating the original feeder 141.

In FIG. 2, an original bundle 100P to be read is placed on the tray 142. On a downstream side in the original feeding direction, a feed roller 1411, a separation-conveying roller 1412, and a registration roller 1413 are disposed. The feed roller 1411 is rotated by a not-illustrated drive source and feeds the original bundle 100P placed on the tray 142. Subsequently, the separation-conveying roller 1412 disposed on the downstream side of the feed roller 1411 separates and carries an uppermost original 100 from the carried original bundle 100P. The rotation start of the registration roller 1413 disposed on the downstream side of the separation-conveying roller 1412 is used as a basis of a feeding timing and an image reading timing of subsequently fed originals 100.

The drive source for driving the feed roller 1411, the separation-conveying roller 1412, and the registration roller 1413 is, for example, a stepping motor.

The original 100 discharged from the registration roller 1413 travels along a guide plate 1418 and is carried along the outer periphery of a rotating carriage drum 1415 having a large diameter while being sandwiched by the carriage drum 1415 and driven rollers 1416a, 1416b, and 1416c. The original 100 travels along the plane of a platen glass 1401 once and is carried at constant speed in the direction of the arrow in FIG. 2.

An image reading unit which will be described below reads the original 100 when the original 100 passes the plane of the platen glass 1401.

After the image reading, the original 100 is continuously carried along the outer periphery of the carriage drum 1415 and discharged onto the original feeder 141 by sheet discharge rollers 1417.

In the skimming-through mode, it is sufficient to move the original in a predetermined direction, so that a large amount of originals can be continuously read at high speed.

Next, the image reading unit in the exemplary embodiment will be described. In the skimming-through mode, the original 100 passes the plane of the platen glass 1401 as described above. At this time, a first mirror unit 1409 and a second mirror unit 1410 are moved by a motor 1408 and are fixedly disposed in positions illustrated in the diagram. Therefore, when the original 100 faces the plane of the platen glass 1401, the original 100 is irradiated with light from an illumination lamp 1402 in the first mirror unit 1409. The reflection light is reflected by mirrors 1403, 1404, and 1405, and an image is formed on a charge-coupled device (CCD) sensor 1407 by a lens 1406. The reflection light which is supplied to the CCD sensor 1407 is converted to an electric signal by the sensor. The electric signal of a pixel is converted to digital data by a not-illustrated A/D converter, and the digital data is supplied as a pixel signal Din to the controller 200.

In the method, the stick-shaped light source is used. A reading line is set in parallel to the longitudinal direction of the light source, and an original is carried in a direction perpendicular to the reading line. A direction parallel to the reading line is defined as a main scan direction, and a direction orthogonal to the reading line (document feeding direction) is defined as a sub-scan-direction.

Except for the skimming-through mode, there is a method for reading an image by placing an original to be read on the platen glass 1401. In the case of this method, the first mirror unit 1409 including the mirror 1403 and the illumination lamp 1402 moves at velocity "v" below the platen glass 1401 on which the original is placed and, further, the second mirror unit 1410 including the mirrors 1404 and 1405 moves at velocity ½ v in the direction similar to that of the first mirror unit 1409, thereby scanning the front face of the original 100. The first and second mirror units 1409 and 1410 are driven by the motor 1408.

<Controller in Copying Machine>

Figure 3:
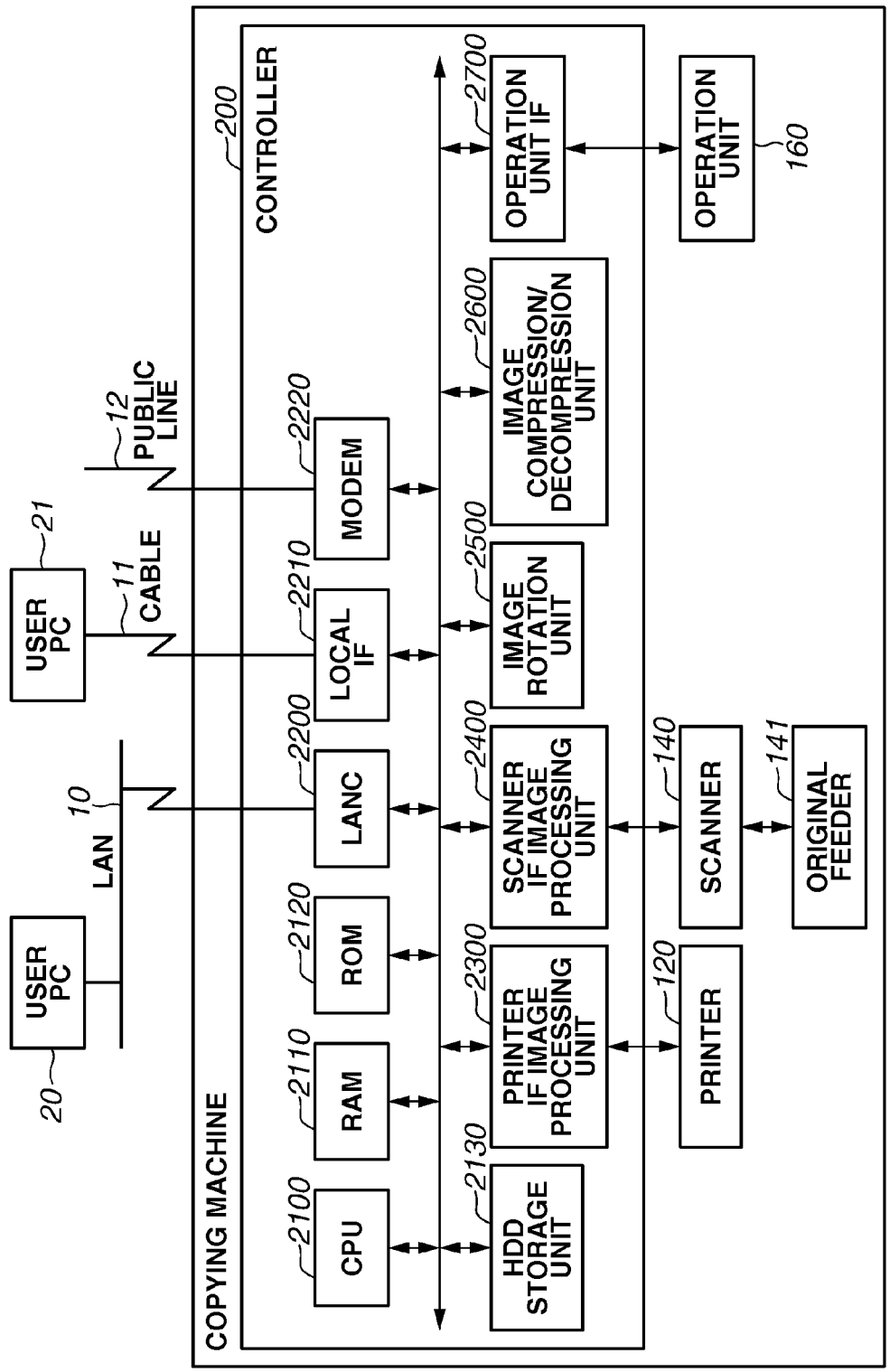
FIG. 3 is a block diagram illustrating a configuration example of a controller.

FIG. 3 is a block diagram illustrating the details of a hardware configuration of a copying machine 110 used in the exemplary embodiment, particularly, a configuration example of the controller.

The controller 200 is connected to the scanner unit 140 serving as an image input device, the printer 120 serving as an image output device, a local area network (LAN) 10, and a public line (wide area network (WAN)) 12, generally controls the operation of the copying machine, and controls input/output of image information and device information.

A central processing unit (CPU) 2100 is a processor controlling the entire copying machine and generally controls accesses to various devices being connected based on a control program or the like stored in a read-only memory (ROM) 2120. The CPU 2100 also generally controls various processes performed in the controller 200. A random access memory (RAM) 2110 is a system work memory for operation of the CPU 2100 and is also an image memory for temporarily storing image data and the like. The ROM 2120 is a boot ROM and stores a boot program of the system. A hard disk drive (HDD) 2130 mainly stores information (system software) for activating/operating the computer and image data. The data may not be stored necessarily in the HDD 2130 but may be stored in a recording medium which can store data even when the power is off.

A local area network controller (LANC) 2200 is connected to the LAN 10 and inputs/outputs image data for output and information related to device control to/from a user personal computer (PC) 20. A local interface (local IF) 2210 is an interface of a universal serial bus (USB) or the like and is connected to a user PC 21 or a printer via a cable 11 to input/output data. A MODEM 2220 is connected to the public line 12 to input/output data.

A printer IF image processing unit 2300 is connected to the printer 120 and performs communication with a CPU mounted on the printer 120. The printer IF image processing unit 2300 performs an image process for conversion of a synchronous system/asynchronous system of image data and print output. A scanner IF image processing unit 2400 is connected to the scanner unit 140 including the original feeder 141 and performs communication with the CPU mounted on the scanner unit 140. The scanner IF image processing unit 2400 performs conversion of a synchronous system/asynchronous system with respect to image data, and image processes for image reading including a streak detection process and a blank-sheet detection process.

An image rotation unit 2500 performs a rotation process on input image data, based on process conditions set by the user via the operation unit 160 and the orientation of the original.

An image compression/decompression unit 2600 performs a process for compressing image data of multiple values to Joint Photographic Experts Group (JPEG) data, compressing binary image data to data of Joint Bi-level Image Experts Group (JBIG), Modified Modified Read (MMR), Modified Hoffman (MH), or the like and, as necessary, decompressing the compressed image data.

An operation IF 2700 is an interface for outputting image data to be displayed in the operation unit 160 from the controller 200 to the operation unit 160 and outputting information entered from the operation unit 160 by the user of the copying machine to the controller 200.

<Operation Unit in Copying Machine>

Figure 4:
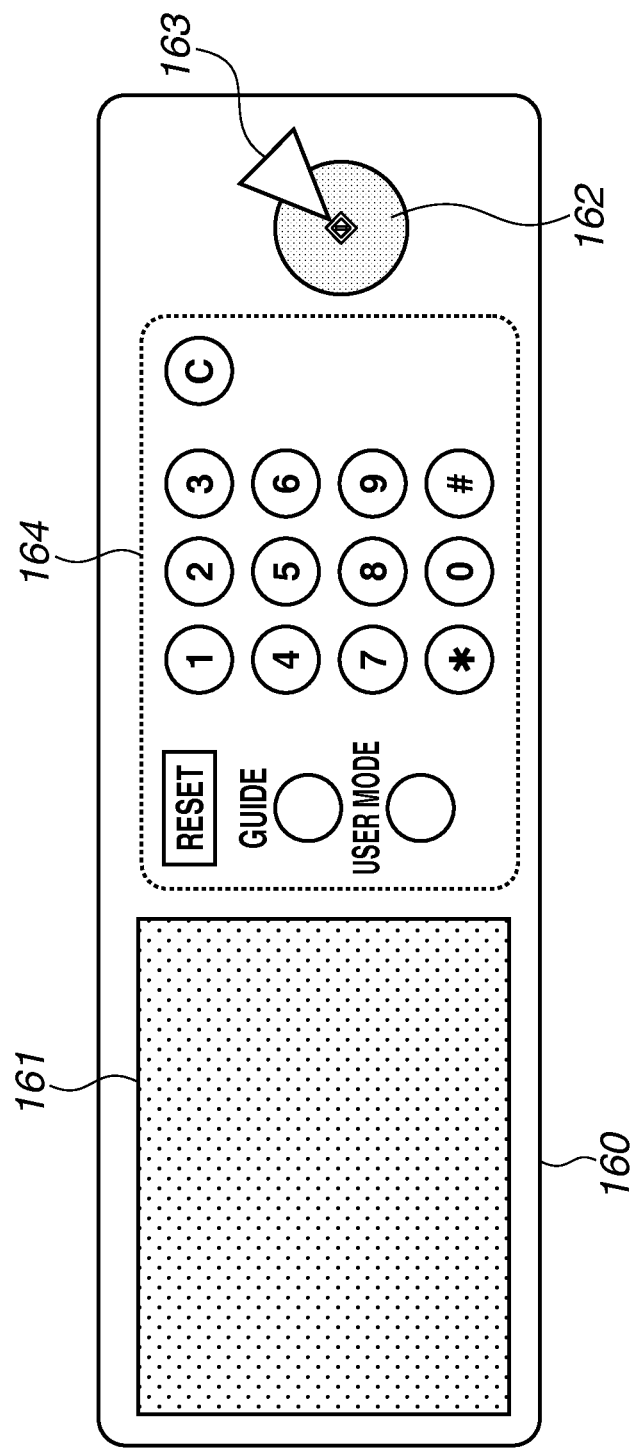
FIG. 4 is a diagram illustrating a configuration example of an operation unit.

FIG. 4 is a diagram illustrating a configuration example of the operation unit 160.

A liquid crystal operation panel (display unit) 161 is a combination of a liquid crystal and a touch panel, displays an operation screen and, when a display key is touched by the user, sends the information to the controller 200. A start key 162 is used at the time of starting an operation of reading and printing an original image or used to issue a start instruction of other functions. In the start key, light-emitting diodes (LEDs) of two colors of green and red are assembled. When the green light is on, it shows that the operation can be started. When the red light is on, it shows that the operation cannot be started. A stop key 163 stops the operation being performed. A hard key group 164 includes a numerical keypad, a clear key, a reset key, a guide key, and a user mode key.

<Scanner IF Image Processing Unit>

Figure 5:
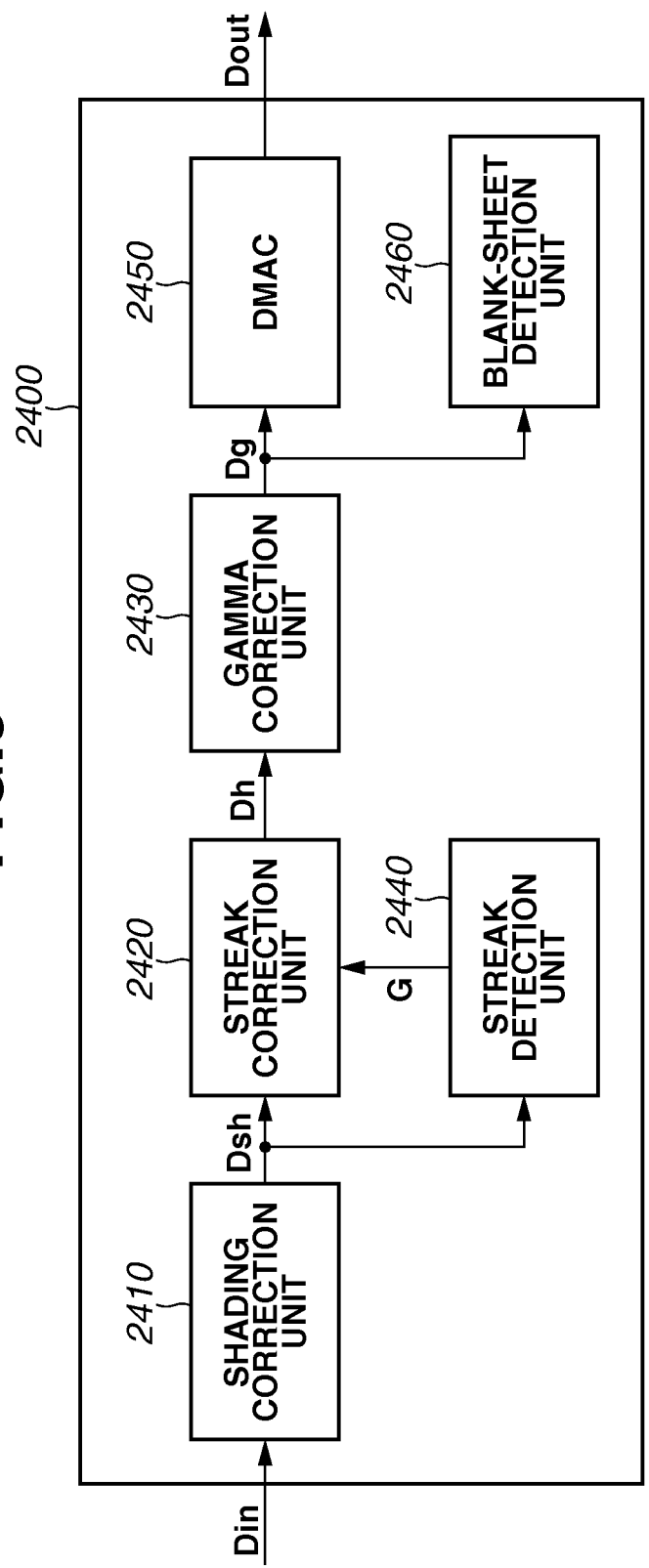
FIG. 5 is a block diagram illustrating a configuration example of a scanner interface (IF) image processing unit.

FIG. 5 is a block diagram illustrating a configuration example of the scanner IF image processing unit 2400.

As described above, in the case of the skimming-through mode illustrated in FIG. 2, a fixedly attached dust, a floating dust, dirt, scratch, blot, or the like existing in the original reading position of the optical system fixing position causes occurrence of a streak. In the following description, the case where cause of the streak is a dust will be described. However, the exemplary embodiment can be applied to a case where cause of the streak is other than a dust.

To a shading correction unit 2410, the pixel signal Din (refer to FIG. 2) output from the scanner unit 140 is supplied. The shading correction unit 2410 performs a correction process with respect to luminance unevenness depending on the characteristics of an optical system and an imaging system by using the conventional technique to obtain an image of uniform brightness. A pixel signal Dsh subjected to the shading correction process is output to a later stage.

When a dust as the streak cause adheres to the original reading position, a streak correction unit 2420 obtains position information G of the streak from a streak detection unit 2440 which will be described below, and performs a correction process to make inconspicuous a streak in a read image which occurs due to the dust. More specifically, the streak correction unit 2420 performs the correction process on the streak by using normal pixels existing in the periphery of the streak to reduce the influence of the dust. Hereinafter, a pixel signal in a streak will be called an abnormal pixel. The detailed correction method for the streak correction process will be described below. A pixel signal Dh subjected to the streak correction process is output to the later stage.

The gamma correction unit 2430 corrects the difference in color characteristics between a reading element and a device by using a conventional technique. A pixel signal Dg subjected to the gamma correction process is output to the later stage.

A direct memory access (DMA) controller 2450 writes the pixel signal Dg output from the gamma correction unit 2430 as data Dout to a designated region in the image memory (RAM 2110) directly, not through the CPU.

In a case where a fixed dust or a floating dust as the streak cause adheres to the original reading position, the streak detection unit 2440 detects the position of the streak caused by the influence of the adhering dust. The detected position information G of the streak is sent to the streak correction unit 2420 and used to specify a correction range (streak position) when an image including the streak is actually input.

<Blank-Sheet Detection Unit>

A blank sheet refers to an original having no printing information (that is, content). When there is no printing information, a colored original like a colored sheet and a recycled paper are also handled as blank sheets. That is, blank-sheet detection is determination of the presence or absence of content printed on an original. Image data having no printing information and image data of only an offset at the time of reading is also called a blank sheet. On the other hand, an original on which a small amount of characters, dilute characters printed by halftone dots, or the like are written is not a blank sheet.

Image data obtained by reading a sheet including printing information hand-written or printed by a printer is called content data.

Figure 6:
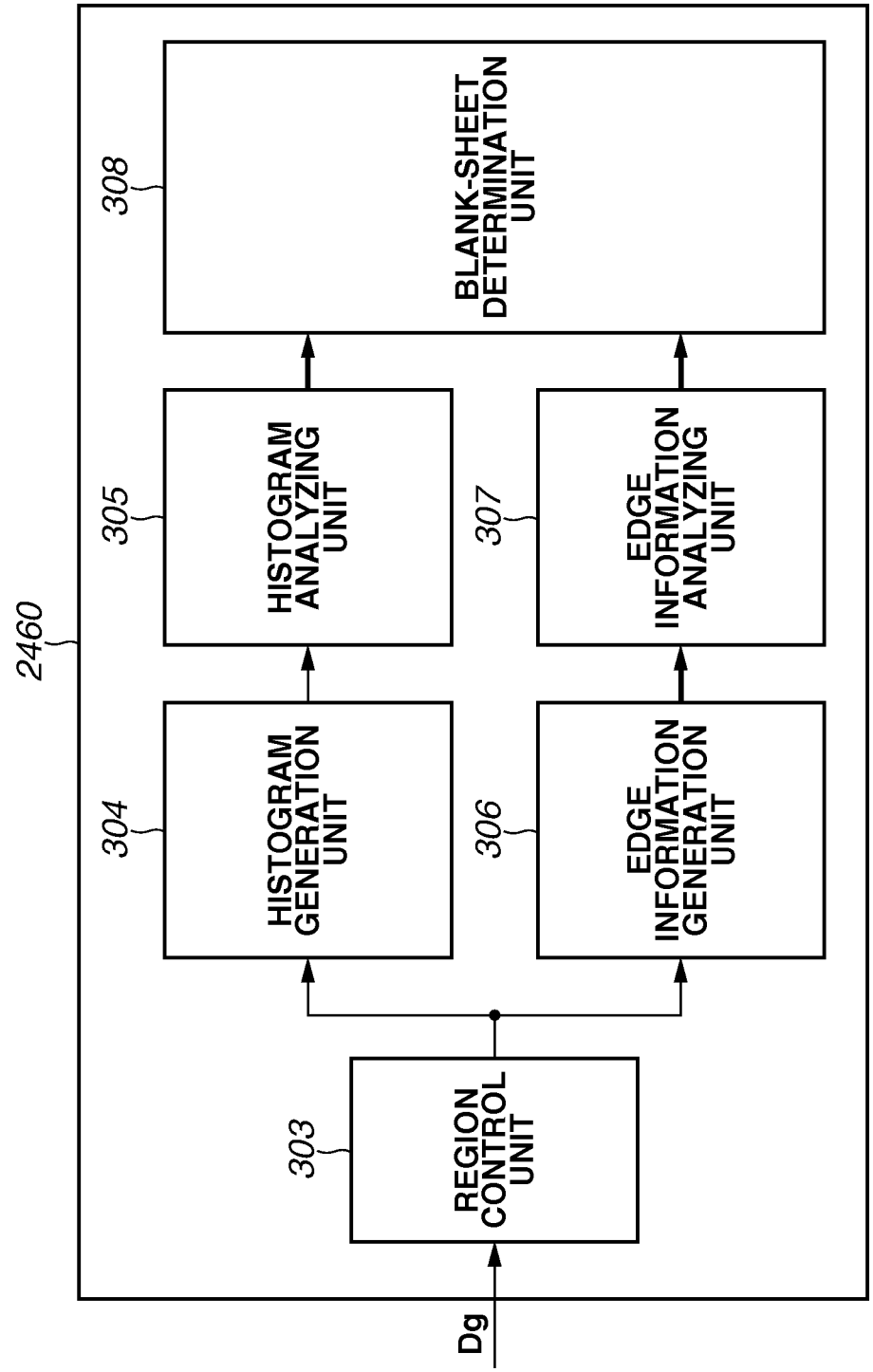
FIG. 6 is a block diagram illustrating a configuration example of a blank-sheet detection unit.

FIG. 6 is a diagram illustrating an internal configuration of a blank-sheet detection unit 2460 in the exemplary embodiment. It is assumed that the blank-sheet detection unit 2460 is connected to a not-illustrated register, and control parameters and process results are held therein. Writing in the register is performed by the CPU 2100 and the blank-sheet detection unit 2460, and the blank-sheet detection unit 2460 reads the control parameters which are set in the register to perform an operation.

The blank-sheet detection unit 2460 eventually holds a result of determination of whether a read original is a blank sheet and holds a plurality of results, which is a feature of the present exemplary embodiment. That is, a plurality of the control parameters is held, and a plurality of blank-sheet determination results can be held. The details of the plurality of control parameters will be described below.

In the exemplary embodiment, to the blank-sheet detection unit 2460, the pixel signal Dg output from the gamma correction unit 2430 is supplied.

A region control unit 303 controls a region for generating a histogram and edge information from the input image data. When the original feeder 141 reads an original, the front end, rear end, right end, and left end of the original depend on the feeding form of the original and the light source configuration of the CCD sensor 1407.

The region control unit 303 determines whether a position of a pixel presently input within the original is in a valid region or an invalid region, and generates a signal indicative of the valid region or invalid region.

The front end, rear end, right end, and left end, that is, the peripheral part of the image data read by the original feeder 141 include data of a shadow which comes into existence under the influence of the light source.

If a value other than the image data of the original is used in the histogram generation and the edge information generation, accurate analysis is disturbed. It is therefore necessary to perform control which does not use the information of the shadow part.

The region control unit 303 specifies such a shadow part and outputs a signal handling the shadow part as an invalid region and a part other than the shadow as a valid region so as not to generate histogram or edge information in a later-stage process.

For example, in the case of reading an original of A4 size, data of a shadow is included in a region of a width of about 2 mm in the front end, rear end, right end, and left end, so that the region is set as an invalid region.

It is also possible to adjust the width of the invalid region and perform control so that a region in which a punch hole exists becomes an invalid region.

The valid region is a region other than the invalid region in the image data and refers to a region to be processed.

Further, a region control unit 303 divides a main scan valid region and a sub-scan valid region in an original into a plurality of regions. That is, the region control unit 303 outputs a valid/invalid region signal 509 and a region signal 510 in addition to the pixel signal Dg to processing units in the later stage (a histogram generation unit 304 and an edge information generation unit 306).

Figure 7A:
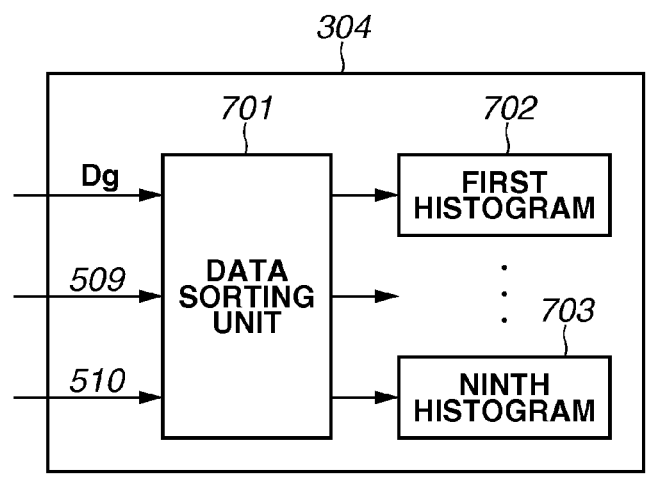
FIGS. 7A and 7B are block diagrams illustrating an example of a histogram generation unit and an edge information generation unit.
Figure 7B:
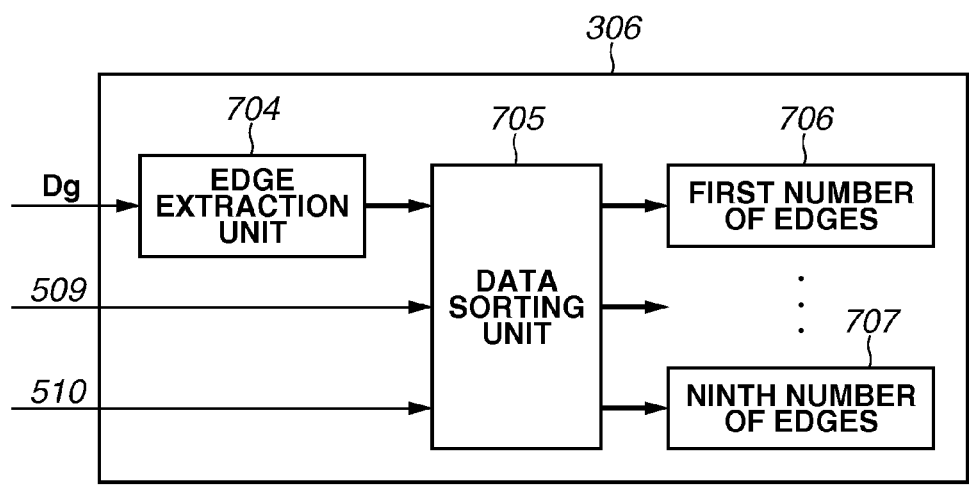

FIGS. 7A and 7B illustrate the internal configuration of the histogram generation unit 304 and the edge information generation unit 306. FIG. 7A illustrates an internal configuration of the histogram generation unit 304.

A data sorting unit 701 is a data sorting unit which reflects the frequency of pixel values to the histogram of each divided region at a later stage according to the frequency of image data 301, a valid/invalid region signal 509, and a region signal 510. In each histogram, the frequency corresponding to the pixel value of the sorted image data is added. Since the image data 301, the valid/invalid region signal 509, and the region signal 510 have to be synchronized, the image data 301 has to be delayed according to delay in a signal in a region control unit or the like. However, the description will not be repeated here. When the valid/invalid region signal 509 indicates an invalid region, a signal is not output to the later stage. In the case of generating a histogram in 32 tones (five bits) for the bit precision (for example, eight bits) of the pixel signal Dg, there is the function of outputting five bits obtained by eliminating lower three bits to the later stage. That is, there is also a function of quantizing input image data and reflecting it to the frequency distribution. To simplify the description, second to eighth histograms are not illustrated but only a first histogram 702 and a ninth histogram 703 are illustrated in FIG. 7A.

FIG. 7B illustrates the internal configuration of the edge information generation unit 306.

An edge extraction unit 704 extracts an edge from the image data 301. For example, convolution operation is performed by using a matrix of 7×7. When an output is equal to or larger than a threshold, an edge signal indicating that the part is an edge is output to the later stage. When an output is less than the threshold, an edge signal indicating that the part is not an edge is output to the later stage. It is assumed that the matrix coefficient and threshold of 7×7 are read by the not-illustrated register. A data sorting unit 705 reflects to the number of edges in the later stage according to the edge signal output from the edge extraction unit 704, the valid/invalid region signal 509, and the region signal 510. Specifically, when it is indicated by the edge signal that the part is an edge, a signal is output to the number of edges of a divided region specified by the valid/invalid region signal 509 and the region signal 510, thereby adding, for example, one to the number of edges of the divided region. When the valid/invalid region signal indicates an invalid region, no signal is output to the later stage. For simplicity of description, the second to eighth edge numbers are not illustrated, and only a first edge number 706 and a ninth edge number 707 are illustrated in FIG. 7B.

A plurality of threshold parameters used in the edge extraction unit 704 is employed to obtain a plurality of results of blank-sheet determinations. Consequently, the numbers of edges according to the threshold parameters are held as the first and ninth edge numbers 706 and 707.

The blank-sheet detection unit 2460 of FIG. 6 will be described again.

A histogram analyzing unit 305 determines whether an original is a blank sheet based on the first to ninth histograms generated by the histogram generation unit 304.

Figure 8:
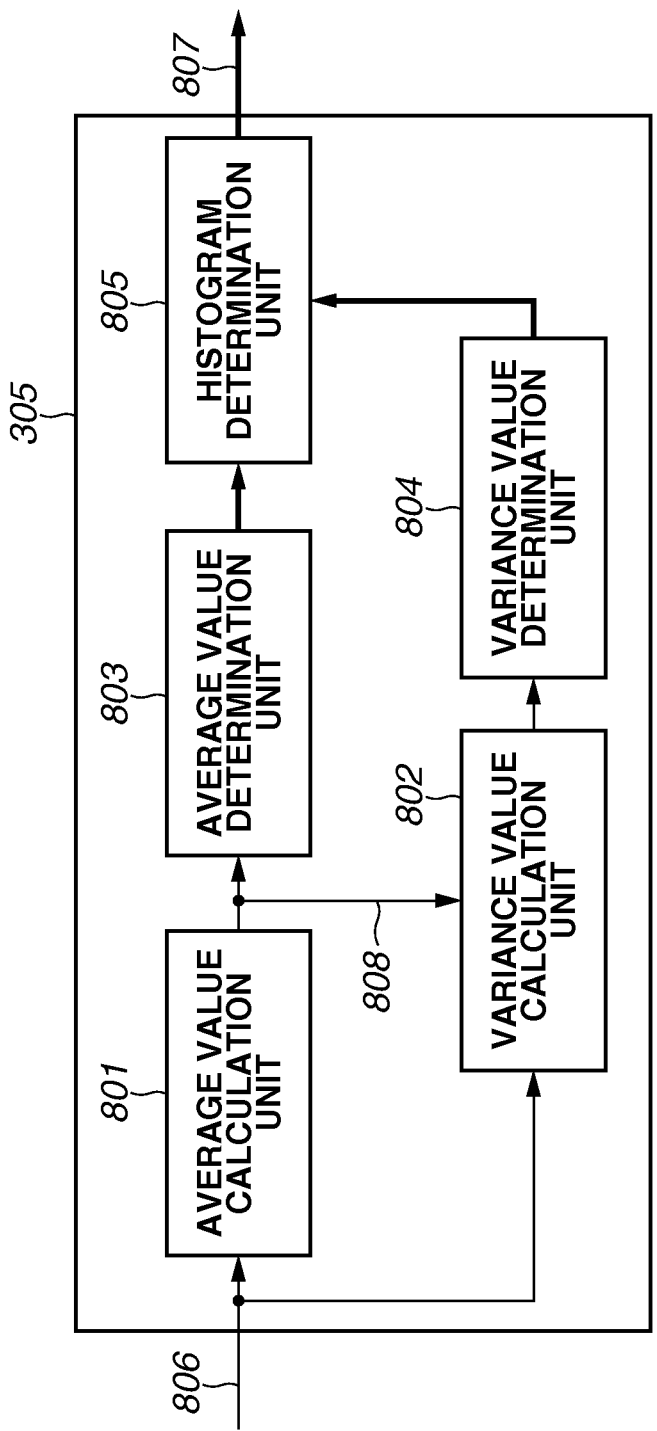
FIG. 8 is a block diagram illustrating an example of a histogram analyzing unit.

FIG. 8 illustrates the internal configuration of the histogram analyzing unit 305.

An average value calculation unit 801 calculates first to ninth average values 808 from first to ninth histograms 806 generated by the histogram generation unit 304, respectively.

The histogram 806 includes, for example, a value indicative of a region, a value indicative of a brightness value, and a value indicative of the frequency of each brightness.

The brightness can be obtained by extracting only the G signal from red, green, and blue (RGB) data of read image data. The brightness obtaining method is not limited to this method, and any method can be employed as long as brightness is obtained.

The first to ninth average values 808 are average values of pixel values of divided regions. A variance value calculation unit 802 calculates a variance of a pixel value in each of first to ninth divided regions from the first to ninth histograms generated by the histogram generation unit 304 and from the first to ninth average values calculated by the average value calculation unit 801.

A difference value is calculated by (average value−brightness value)×(average value−brightness value)×frequency. By performing cumulative addition of the different values for all of the brightness values and, further, performing a dividing process on a cumulative addition value by all of the frequencies, a variance value is calculated. For example, when there is any printed matter, the variance value is high. In the case of only a base color, a low variance value is calculated.

An average value determination unit 803 determines whether a divided region is covered with a thickly printed matter (for example, a dark part in a picture) by comparing the average value calculated by the average value calculation unit 801 with a threshold. When the average value is equal to or larger than the threshold, a determination signal indicative of a blank sheet is output. When the average value is less than the threshold, a determination signal indicative of content (not blank sheet) is output. The average value determination unit 803 makes the determination on each of the first to ninth regions.

The variance value determination unit 804 determines a variation of the brightness values in the divided region by comparing the variance value calculated by the variance value calculation unit 802 with the threshold. When the variance value is equal to or larger than the threshold, the variation in the brightness is large, so that the presence of a printed matter is determined. When the variance value is less than the threshold, the variation in the brightness is small, so that it is determined that there is only a foundation, and a determination signal indicating a blank sheet is output.

A variance value determination unit 804 makes determination on each of the first to ninth regions.

A histogram determination unit 805 determines whether an original image 203 is a blank sheet based on the determination signal of the average value determination unit 803 and the determination signal of the variance value determination unit 804. When all of determination signals of the average value determination unit 803 and determination signals of the variance value determination unit 804 in the first to ninth regions indicate blank sheet candidates, a blank-sheet candidate signal is output. When a signal indicative of content exists even in only one region, a determination signal 807 indicative of content, that is, not blank sheet is output.

When a signal indicative of content exists even in one region, it is determined as the content. However, for example, it is also possible to perform a threshold process on the number of regions determined as content and, when content is determined in a predetermined number of regions or more, a signal determining content is output.

A plurality of threshold parameters is used in the average value determination unit 803 and a plurality of threshold parameters is used in the variance value determination unit 804 to obtain a plurality of results of blank-sheet determinations. Consequently, the determination signals 807 output from the histogram determination unit 805 are a plurality of determination results at a plurality of levels (plurality of parameters).

Figure 9:
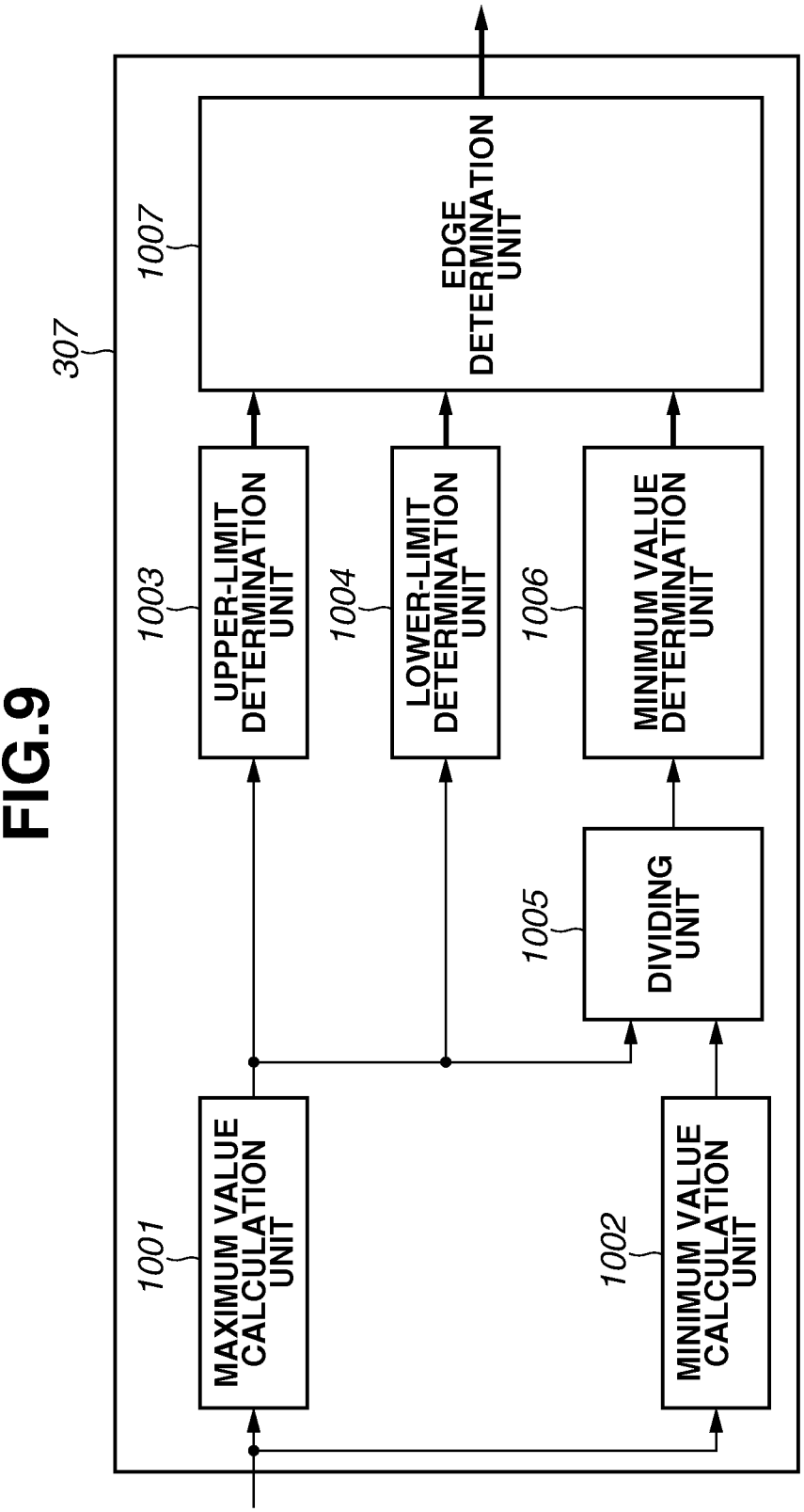
FIG. 9 is a block diagram illustrating an example of an edge information analyzing unit.

FIG. 9 illustrates the internal configuration of an edge information analyzing unit 307.

A maximum value calculation unit 1001 obtains the maximum number of edges from the first to ninth numbers of edges generated by the edge information generation unit 306.

A minimum value calculation unit 1002 obtains the minimum number of edges from the first to ninth numbers of edges generated by the edge information generation unit 306.

An upper-limit determination unit 1003 performs a threshold process on the maximum number of edges determined by the maximum value calculation unit 1001 and outputs a determination signal indicating whether the image is a blank sheet. As a determination signal, when the number of edges is equal to or larger than the threshold, a content signal is output. When the number of edges is less than the threshold, a blank-sheet candidate signal is output. For example, in the case of a digital multifunction machine or the like, in some cases, a security dot or the like is printed to restrict copying of a printed matter. When the printing is performed in the entire face of an original, there is a case that the number of edges is calculated in all of regions at the time of comparing the edge distributions between regions in a later stage, and the image is determined as a blank sheet. That is, when the number of edges exceeds the predetermined number of edges, it has to be determined as content. In the present process, for example, the number of about 150,000 edges is set as the threshold.

A lower-limit determination unit 1004 performs a threshold process on the maximum number of edges obtained by the maximum value calculation unit 1001 and outputs a determination signal indicating whether the image is a blank sheet. When the number of edges is equal to or larger than the threshold, a determination signal indicative of a content candidate is output. When the number of edges is less than the threshold, a determination signal determining that the image is a blank sheet is output.

For example, in a good-quality sheet such as a coated sheet, there is a case that an edge is hardly extracted. Specifically, when the number of edges in a region is 10 and the number of edges in another region is zero, if comparison is made by relative values between the regions, 0/10=0. The correlation value is the minimum, and it may be determined as content. A low relative value means the large difference in the number of edges between the regions.

For example, in the case of a general blank sheet, when the maximum number of edges is 320 and the minimum number of edges is 300, 300/320=0.93, so that the relative value is high. That is, when the number of edges is below the predetermined number of edges in each region, it is determined as a blank sheet. In the process, for example, the number of edges of about 400 is set as the threshold. This is the number of edges extracted in the case of using a general blank sheet.

A dividing unit 1005 performs a diving process between the maximum number of edges calculated by the maximum value calculation unit 1001 and the minimum number of edges calculated by the minimum value calculation unit 1002 to calculate a correlation value between the regions. In this case, the correlation value is calculated by the minimum number of edges/the maximum number of edges.

A minimum value determination unit 1006 outputs a determination signal whether it is a blank sheet, based on the correction value calculated by the dividing unit 1005. By making a comparison between the correlation value calculated by the dividing unit 1005 and the threshold, the minimum value determination unit 1006 determines that it is a blank sheet when the correlation value is equal to or larger than the threshold. The minimum value determination unit 1006 determines that it is content when the correlation value is less than the threshold. That is, when the correlation value is high, the difference between the maximum number of edges and the minimum number of edges is small, so that the image is determined as a blank sheet. When the correlation value is low, the difference between the maximum number of edges and the minimum number of edges is large, so that the image is determined as content.

An edge determination unit 1007 determines whether the image is a blank sheet based on the determination signal of the upper-limit determination unit 1003, the determination signal of the lower-limit determination unit 1004, and the determination signal of the minimum value determination unit 1006.

When the determination signal of the upper-limit determination unit 1003 indicates content, the determination signals of the lower-limit determination unit 1004 and the minimum value determination unit 1006 are not referred to, and a determination signal determining that the image is content is output.

When the determination signal of the upper-limit determination unit 1003 is a blank sheet candidate and the determination signal of the lower-limit determination unit 1004 is a blank sheet, the determination signal of the minimum value determination unit 1006 is not referred to, and a determination signal determining that the image is a blank sheet is output. When the determination signal of the upper-limit determination unit 1003 is a blank sheet candidate and the determination signal of the lower-limit determination unit 1004 is a content candidate, the determination signal of the minimum value determination unit 1006 is output.

A plurality of threshold parameters used in the upper-limit determination unit 1003 to obtain results of blank-sheet determinations at a plurality of levels is employed. Consequently, a plurality of edge determination results by threshold parameters is output from the edge determination unit 1007.

The blank-sheet detection unit 2460 of FIG. 6 will be described again.

A blank-sheet determination unit 308 finally determines whether the original is a blank sheet based on the determination signals of the histogram analyzing unit 305 and the edge information analyzing unit 307.

When the determination signal from the histogram analyzing unit 305 indicates a blank sheet and the determination signal from the edge information analyzing unit 307 is a blank sheet, a signal determining that the read original image is a blank sheet is calculated. When even one of the determination signals of the histogram analyzing unit 305 and the edge information analyzing unit 307 indicates content, a signal determining that the read original image is content is calculated. Completion of the blank-sheet detection process is notified to the CPU 2100.

By referring to the results of the plurality of threshold parameters used in the histogram analyzing unit 305 and the edge information analyzing unit 307 to obtain blank-sheet determination results at a plurality of levels, the blank-sheet determination unit 308 calculates determination results at a plurality of levels. That is, a plurality of results of determinations of whether the original is a blank sheet is calculated and held.

Although the configuration having a plurality of threshold parameters of the units (704, 803, 804, and 1003) is employed as an exemplary embodiment, the present invention is not limited to the configuration. The present exemplary embodiment may finally calculate/hold a plurality of determination results by having a plurality of threshold parameters and various control parameters of other processing units.

When results of threshold parameters are exhaustively calculated, results with excessive computation load such as "the number of threshold parameters*the number of kinds of threshold parameters" are calculated. To avoid such a load, threshold parameters may be provided with a plurality of levels (for example, five levels) and the threshold parameters are set at each level. With this configuration, the various computations are narrowed to a combination of parameters for each level (for example, five determination results in five patterns), so that the computation load can be lessened.

Although blank-sheet detection has been described above, the present invention is not limited to that method. The blank-sheet detection method used in the exemplary embodiment may be any method if it can determine whether image data obtained by reading an original is a blank sheet having no printing information.

Subsequently, referring to FIGS. 10 to 19, the flow in the case of performing a combination operation of a blank-sheet skip mode and an insertion sheet mode at the time of copying will be described.

First, each of mode setting screens will be described.

Figure 10:
FIG. 10 is a diagram illustrating an example of an insertion sheet setting screen.
Figure 11:
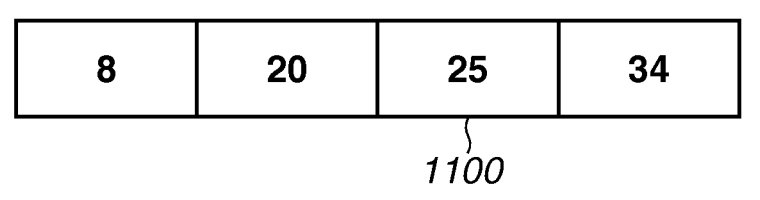
Figure 12:
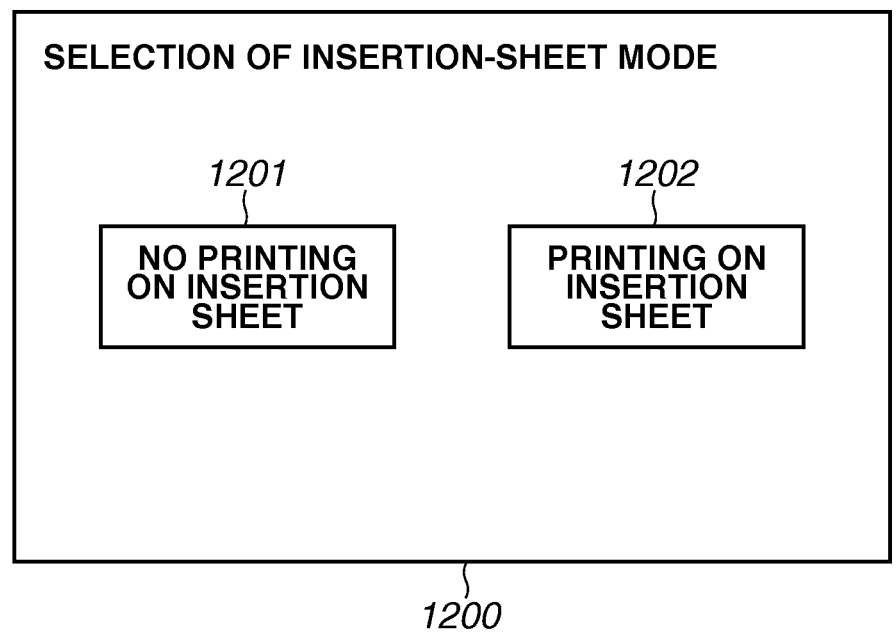
FIG. 12 illustrates an example of an insertion sheet mode setting screen.

FIG. 10 is a diagram illustrating an example of an insertion sheet setting screen. The screen is displayed in the liquid crystal operation panel (display unit) 161. The insertion position of an insertion sheet is determined by page number designation for a printed matter. An insertion sheet is inserted before a sheet in which a page designated for the printed matter is printed. The insertion sheet can be inserted in a plurality of places and it is realized by repeating the designation in FIG. 10 a plurality of times. A setting value is held in the RAM 2110 with a list structure illustrated in FIG. 11. FIG. 12 illustrates an example of a setting screen in an insertion sheet printing mode. The screen is displayed in the liquid crystal operation panel (display unit) 161. A mode 1201 of "not printing in an insertion sheet" is a mode for inserting a blank sheet, a color sheet, or a pre-print sheet (including a tab sheet and the like) including no printing information into a printed matter, and is used, particularly, when an insertion sheet is not included in an original to be printed. A mode 1202 of "printing in an insertion sheet" is a mode for copying also to an insertion sheet and inserting the sheet, and is used mainly when an insertion sheet is included in the original.

Figure 13:
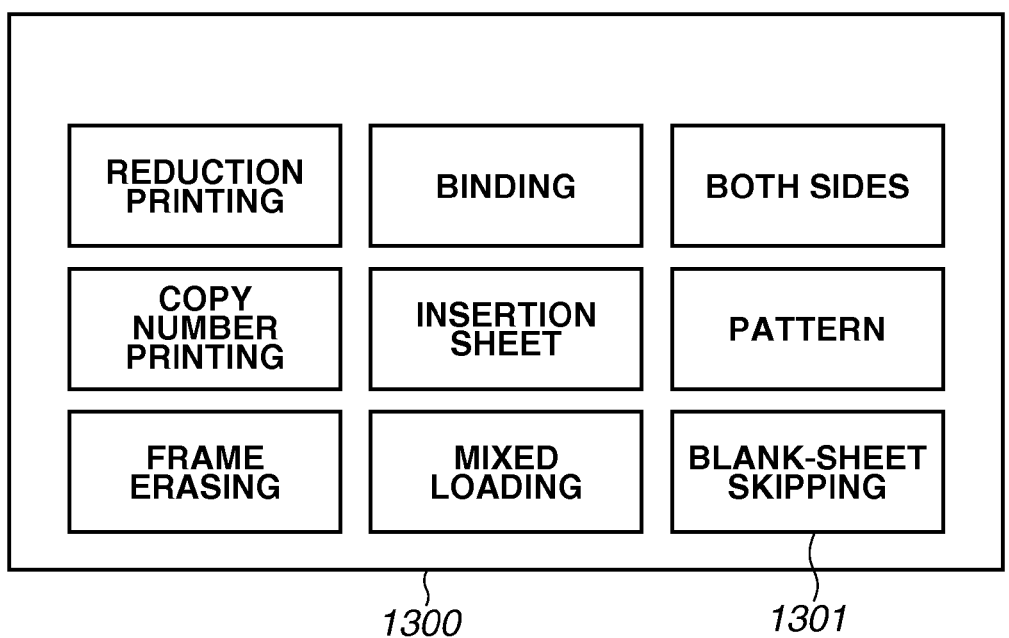
FIG. 13 is a diagram illustrating an example of a blank-sheet skip mode setting screen.

FIG. 13 is a diagram illustrating an example of a setting screen of various application modes. The screen is displayed in the liquid crystal operation panel (display unit) 161. By selecting a blank-sheet skip mode 1301, a blank-sheet skip mode is made valid. Blank-sheet skip printing is a process, in which when a page including image data determined as a blank sheet is detected in a process for reading an original image, the page is not printed and the next page which is not determined as a blank sheet is printed in that printing page. That is, by performing the blank-sheet skip printing, the area of a sheet necessary for printing decreases.

Subsequently, a copying operation will be described. FIGS. 14 to 19 are flowcharts illustrating the flow of a scanning process and the flow of a printing process. The copying operation is realized by operating the scanning process and the printing process in parallel.

First, the scanning operation will be described.

Figure 14:
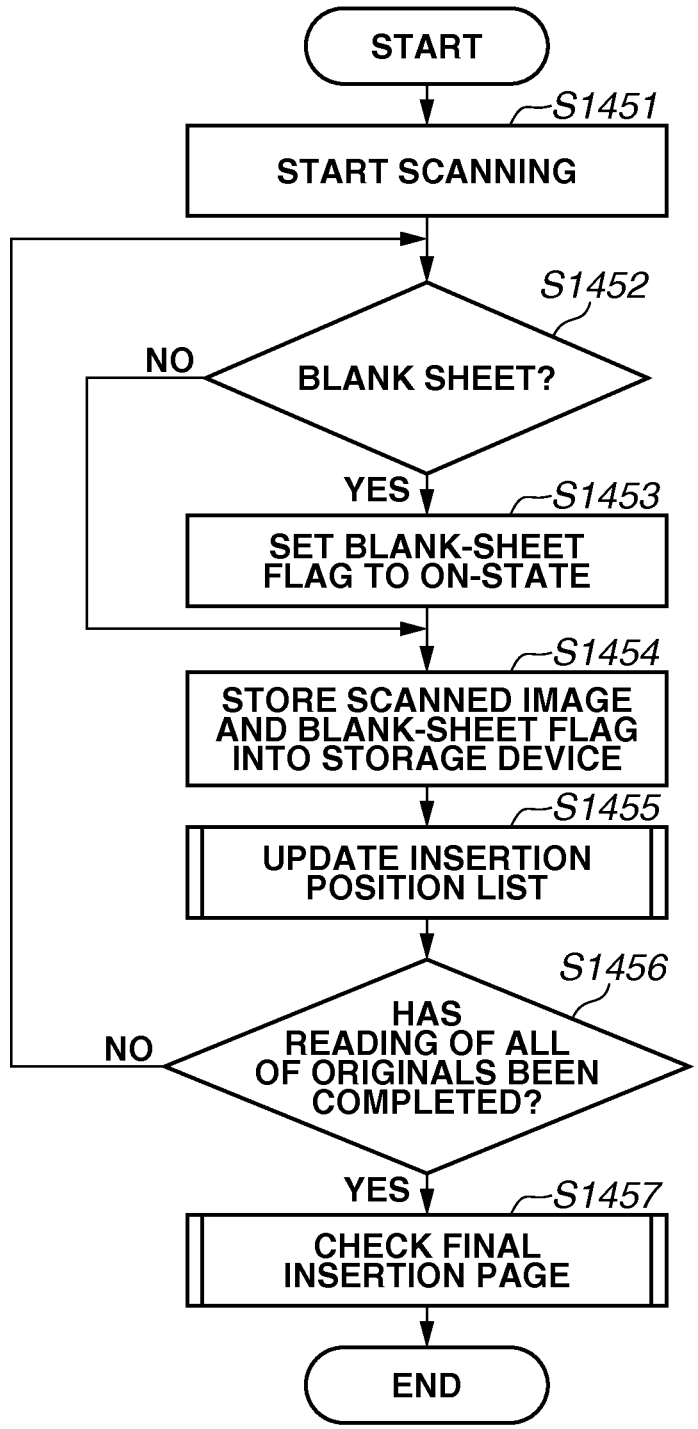
FIG. 14 is a flowchart illustrating the flow of a scanning process.

FIG. 14 is a flowchart illustrating the flow of the scanning process. A program related to the process illustrated in the flowchart is controlled in such a way that the CPU 2100 of the controller 200 sequentially reads programs stored in the ROM 2120 and the hard disk 2130 into the RAM 2110 and executes them.

In step S1451, scanning of an original including a plurality of pages is started. In step S1452, whether the scanned original is a blank sheet is determined for each of pages including image data (scan data) obtained by scanning the original. The blank-sheet determination is made by the blank-sheet determination unit 308. When it is determined that the scan data is a blank sheet (Yes in step S1452), the operation proceeds to step S1453. A blank-sheet flag indicating that a page corresponding to the scan data is a blank sheet is set to an on state. In step S1454, the scan data and the blank-sheet flag set in step S1453 are stored into the storage unit 2130. In subroutine, step S1455, an insertion position list 1100 is updated. The detailed flow of subroutine, step S1455, will be described with reference to FIG. 15.

Figure 15:
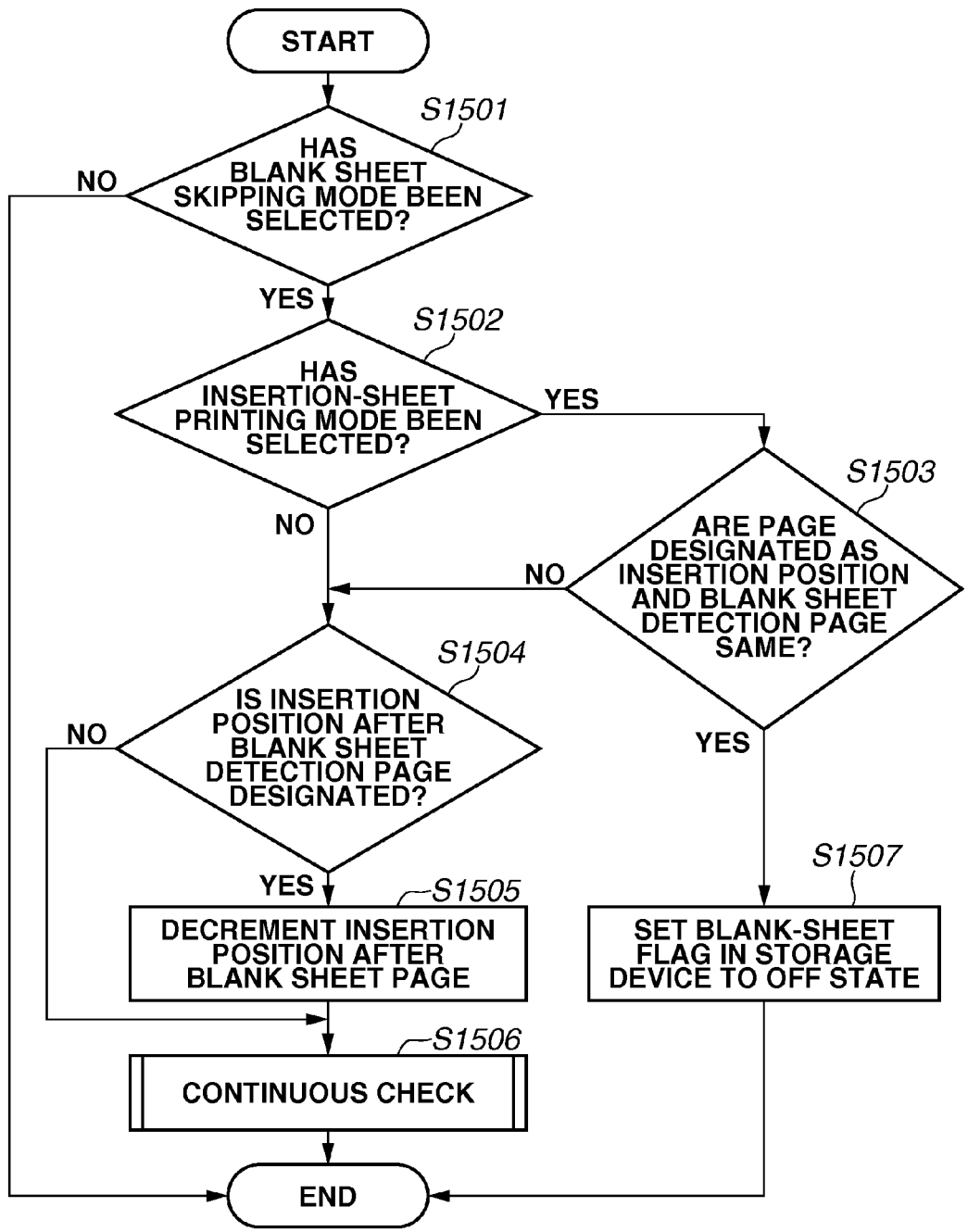
FIG. 15 is a flowchart illustrating the flow of an insertion sheet insertion position updating process.

FIG. 15 is a flowchart illustrating the details of the process in step S1455. A program related to processes illustrated in the flowchart is controlled in such a way that the CPU 2100 of the controller 200 sequentially reads programs stored in the ROM 2120 and the hard disk 2130 into the RAM 2110, and executes them.

In step S1501, whether the blank-sheet skip mode 1301 is selected is determined. When it is determined that the blank-sheet skip mode is not selected (No in step S1501), the subroutine is finished. When it is determined that the blank-sheet skip mode is selected (Yes in step S1501), the operation proceeds to step S1502. Further, it is determined whether a mode 1202 of printing data in an insertion sheet is selected. When it is determined that the mode of printing data in an insertion sheet is selected (Yes in step S1502), the operation proceeds to step S1503. In step S1503, determination is made to see whether a page number of present process target scan-data which is determined as a blank sheet, exists in an insertion position list 1100. When the page number of the present process target scan-data determined as a blank sheet exists in the list (Yes in step S1503), the operation proceeds to step S1507, and the blank-sheet flag stored in the storage unit 2130 is set to the off state.

When an insertion sheet such as a blank sheet or a color sheet having no printing information is inserted in an original, and a setting of printing in the insertion sheet is made, if the insertion sheet is skipped as a blank sheet, a printing result different from a printing result desired by the user is obtained. To avoid it, processes in steps S1503 and S1507 are performed.

That is, by setting the blank-sheet flag of the page of the target scan data to the off state, printing of a sheet to be inserted as an insertion sheet can be prevented from being skipped.

When it is determined that the mode of printing in an insertion sheet is not selected in step S1502 (No in step S1502) and when it is determined that the same page number as the page determined as a blank sheet does not exist in a list of determination results in step S1503 (No in step S1503), the operation proceeds to step S1504. In step S1504, the insertion position list 1100 is searched to check whether the insertion position of an insertion sheet is designated to be placed after the page of the scan data determined as a blank sheet. When the insertion position of the insertion sheet is set after the page of the scan data determined as a blank sheet (Yes in step S1504), the operation proceeds to step S1505. In step S1505, all of the insertion positions of the insertion sheets after the page determined as a blank sheet are decremented. Referring to FIG. 11 as an example, when the scan data of the 21st page is determined as a blank sheet, for example, 25th and 35th pages as insertion positions after the 21st page are decremented and changed to 24th and 34th pages, respectively.

The process is performed to solve the problem that, since the printing of the scan data determined as a blank sheet is skipped, the relative insertion position of the insertion sheet is changed and becomes different from the insertion position designated by the user.

A concrete example will be described. It is assumed that an insertion sheet is designated to be inserted before the fourth page in input image data of the amount of five pages. In this case, the fourth page of output of the input image data is the insertion sheet. However, when the third page which is a blank sheet is not printed in the blank-sheet skip printing, data originally printed in the fourth and fifth pages is printed in the third and fourth pages, respectively. Therefore, the insertion sheet designated to be inserted before the fourth page is inserted before a page in which data originally printed in the fifth page (printed in the fourth page at present) is printed.

That is, when printing is performed in the blank-sheet skip mode, although the fourth sheet in the output remains to be the insertion sheet, the insertion sheet is not inserted before the page designated to be inserted. That is, the absolute position of the insertion sheet is unchanged, but the relative position of the insertion sheet is changed. Therefore, by decrementing the insertion position of the insertion sheet, the relative position is unchanged. That is, in both the case where printing is performed in the blank-sheet skip mode and the case of normal printing in which printing is not performed in the blank-sheet skip mode, image data to be printed in a sheet next to the insertion sheet is the same.

In subroutine step S1506, a continuous check of the insertion position is performed. The detailed flow of subroutine step S1506 will be described with reference to FIG. 16.

Figure 16:
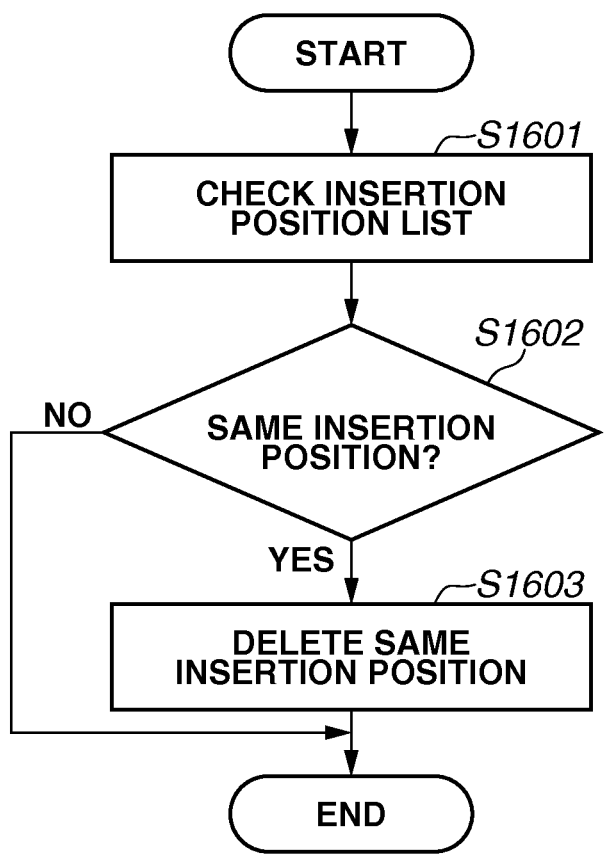
FIG. 16 is a flowchart illustrating the flow of a continuous insertion position checking process.

FIG. 16 is a flowchart illustrating the details of the process in step S1506. A program related to the process illustrated in the flowchart is controlled by sequentially reading programs stored in the ROM 2120 and the hard disk 2130 into the RAM 2110 and executing them by the CPU 2100 of the controller 200.

In step S1601, the contents of the insertion position list 1100 is checked. In step S1602, a check is made to see whether the insertion position is continuously designated in the same page.

For example, when the insertion sheet is designated in each of the third and fourth pages in the insertion position list 1100, if the third page is determined as a blank sheet and is not printed in the blank-sheet skip mode, two insertion sheets are inserted continuously in the second and third pages (the third page is the fourth page which is before a blank sheet is skipped).

When the insertion position is continued in the same page (Yes in step S1602), the operation proceeds to step S1603. In step S1603, the rearward insertion position of the same insertion positions is deleted. The processes in steps S1602 and S1603 are performed to solve the problem that a plurality of insertion sheets is inserted in the same position as a result of adjusting the insertion position in consideration of a blank sheet as shown in the above-described concrete example. After that, the flow of subroutine step S1506 is finished.

The flow of FIG. 15 will be described again. When the process of subroutine step S1506 is finished, the flow of subroutine step S1455 is finished.

The flow of FIG. 14 will be described again. In step S1456, a check is made to see whether reading of all of originals has been completed. When reading of all of originals has not been completed (No in step S1456), the operation returns to step S1452, and the scanning process is continued. When reading of all of originals has been completed, the operation proceeds to subroutine step S1457. The detailed flow of subroutine step S1457 will be described by using FIG. 17.

Figure 17:
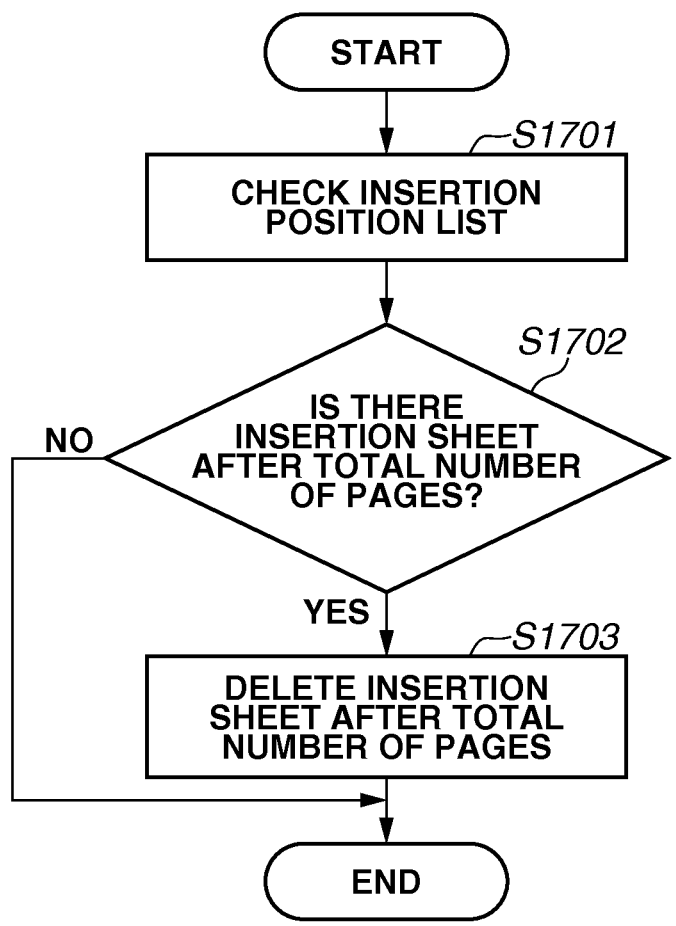
FIG. 17 is a flowchart illustrating the flow of a final insertion position checking process.

FIG. 17 is a flowchart illustrating the details of the process in step S1457. Programs related to the processes illustrated in the flowchart are controlled by sequentially reading the programs stored in the ROM 2120 and the hard disk 2130 into the RAM 2110 and executing them by the CPU 2100 of the controller 200. In step S1701, the contents of the insertion position list 1100 is checked. In step S1702, a check is made to see whether the insertion position of an insertion sheet is designated to be placed after the page number of all of scan data. When the insertion position is designated after the page number (Yes in step S1702), the operation proceeds to step S1703. In step S1703, designation of the insertion position of an insertion sheet after the page number of all of scan data is cancelled. That is, the position of a designated page is eliminated from the insertion position list 110. The processes in steps S1702 and S1703 prevent an insertion sheet from being inserted after the final page as a result of adjusting the insertion position in consideration of a blank sheet. After that, the flow of subroutine step S1457 is finished. When subroutine step S1457 is finished, the flow of the scan is finished. The flow of the scanning process has been described above.

Subsequently, the printing operation will be described.

Figure 18:
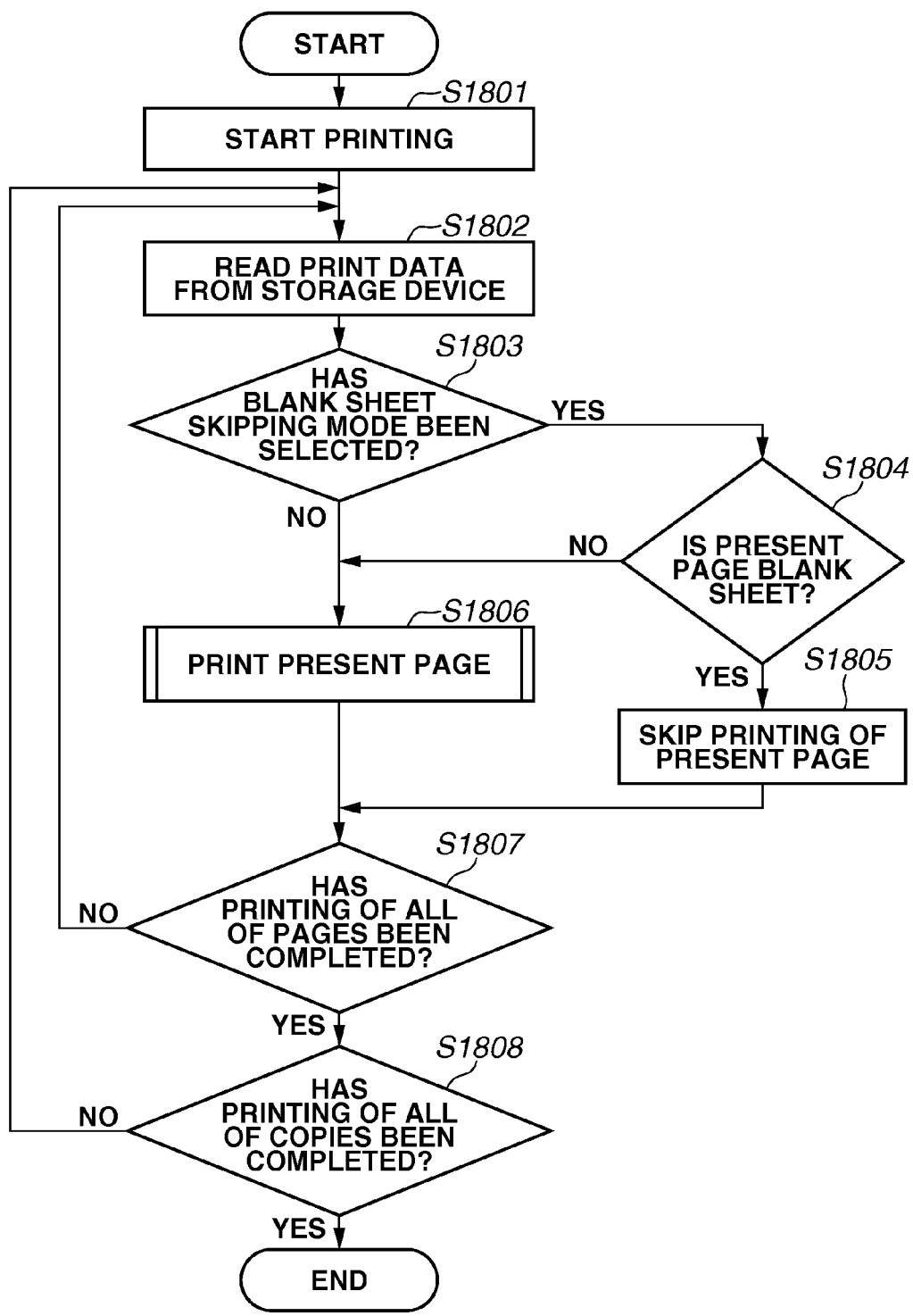
FIG. 18 is a flowchart illustrating the flow of a printing process.

FIG. 18 is a flowchart illustrating the flow of a printing process. Programs related to the processes illustrated in the flowchart are controlled by sequentially reading the programs stored in the ROM 2120 and the hard disk 2130 into the RAM 2110 and executing them by the CPU 2100 of the controller 200. In step S1801, printing is started. In step S1802, print data is read from the storage unit 2130. In step S1803, whether the blank-sheet skip mode 1301 is selected is determined. When it is determined that the blank-sheet skip mode 1301 is selected (Yes in step S1803), the operation proceeds to step S1804. In step S1804, it is determined whether a blank-sheet flag of data read in step S1802 is on. A blank-sheet flag is stored in the storage unit 2130 in steps S1453 and S1454. When a blank sheet is determined as a result of the determination in step S1804 (Yes in step S1804), the operation proceeds to step S1805, and printing of a present process target page is skipped. When it is determined that the blank-sheet skip mode 1301 is not selected as a result of the determination in step S1803 (No in step S1803) and when it is determined that data is not a blank sheet in step S1804 (No in step S1804), the operation proceeds to subroutine step S1806. The detailed flow of subroutine step S1806 will be described with reference to FIG. 19.

FIG. 19 is a flowchart illustrating the details of the process in step S1806. Programs related to the processes illustrated in the flowchart are controlled by sequentially reading the programs stored in the ROM 2120 and the hard disk 2130 into the RAM 2110 and executing them by the CPU 2100 of the controller 200.

In step S1902, as illustrated in the insertion position list 1100 in FIG. 11, whether setting of an insertion sheet is performed is determined. When the insertion sheet setting is not performed (No in step S1902), the operation proceeds to step S1907, and the present process target page is printed. When the insertion sheet setting is performed (Yes in step S1902), the operation proceeds to step S1903. In step S1903, the insertion position list 1100 is obtained. In step S1904, it is determined whether the page number of the present process target print page exists in the insertion position list 1100. When it is determined that the number does not exist in the insertion position list 1100 (No in step S1904), the operation proceeds to step S1907. When it is determined that the number of the present process target print page exists in the insertion position list 1100 (Yes in step S1904), the operation proceeds to step S1905. In step S1905, it is determined whether the mode 1202 of printing in an insertion sheet is selected. When the mode 1202 of printing in an insertion sheet is selected (Yes in step S1905), the operation proceeds to step S1907 and printing is performed. When the mode 1202 is not selected (No in step S1905), the operation proceeds to step S1906. In step S1906, an insertion sheet is fed. After that, the operation proceeds to step S1907, and printing of the present page is performed. After that, the flow of subroutine step S1806 is finished.

The flow of FIG. 18 will be described again. In step S1807, whether printing of all of pages has been finished is determined. When it is determined that printing of all of pages has not been completed (No in step S1807), the operation returns to step S1802, and the printing is continued. When it is determined that printing of all of pages has been completed (Yes in step S1807), the operation proceeds to step S1808. In step S1808, it is determined whether printing of all of copies has been completed. When it is determined that printing of all of copies has not been completed (No in step S1808), the operation returns to step S1802, and the printing is continued. When it is determined that printing of all of copies has been completed (Yes in step S1808), the printing process is finished.

The flow of the printing process has been described above.

The flow when the blank-sheet skip mode and the insertion sheet mode are combined and operated at the time of copying has been described above.

By the above-described processes, even in the case of simultaneously using the blank-sheet skip printing function and the insertion sheet function which employ the blank-sheet detection function of the image reading device, a correct printing result desired by the user can be obtained.

The present invention can be also realized by executing the following process, that is, supplying software (program) realizing the functions of the exemplary embodiment to a system or an apparatus via a network or various storage media and reading and executing the program by a computer (or CPU, micro processing unit (MPU), or the like) of the system or the apparatus.

Although the exemplary embodiment has been described using an electrophotographic device as an example, an ink jet printer, a thermal printer, or the like may be used. The gist of the present invention is not limited to the printer. Although toner in the electrophotographic printing has been described as an example of a recording agent, the recording agent used for printing is not limited to toner but another recording agent such as ink may also be used. The gist of the present invention is not limited to the recording agent.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-189450 filed Sep. 12, 2013, which is hereby incorporated by reference herein in its entirety.

What is claimed is:

1. An image processing apparatus comprising:
a detection unit configured to detect one or more blank pages in image data obtained by reading an input original document, wherein the input original document includes a plurality of pages;
a first determination unit configured to determine a page position of the one or more blank pages in a print output obtained by printing out the image data;
a designation unit configured to designate an insertion position of one or more insertion sheets in the image data, wherein the insertion sheets are not included in the image data obtained by reading the input original document;
a second determination unit configured to determine, when it is instructed to perform blank-sheet skip printing, in which printing is performed while skipping the one or more pages detected as blank by the detection unit from the image data, whether a position of the one or more pages detected as blank by the detection unit is before the insertion position of the one or more insertion sheets instructed by the designation unit to be inserted or not; and
a control unit configured to, when it is determined by the second determination unit that the position of the one or more pages detected as blank is before the insertion position of the insertion sheets instructed to be inserted, keep a relative insertion position of the insertion sheets instructed to be inserted to a position of a preceding page corresponding to the number of the blank pages that are determined to be before the insertion position of the insertion sheets, said keep being performed by decrementing a page number of the insertion sheets, and not to change the page number of the insertion sheets instructed to be inserted when it is not determined that the position of the one or more pages detected as blank is before the page number of the insertion sheets instructed to be inserted,
wherein at least one of the detection unit, the first determination unit, the designation unit, the second determination unit and the control unit are implemented by a processor.

2. The image processing apparatus according to claim 1, wherein if the insertion position of the one or more insertion sheets and the page position of the one or more blank pages are the same in the image data, the detected one or more blank pages are printed.

3. The image processing apparatus according to claim 1, wherein, in a case where the one or more insertion sheets are determined to be inserted one after another after the control unit changes the designation insertion position of the insertion sheets, only one insertion sheet is inserted.

4. The image processing apparatus according to claim 1, wherein, in a case where the designated insertion position of the insertion sheet changed by the control unit is after the final page of the image data, an insertion of the insertion sheet is cancelled.

5. An image processing method comprising:
detecting one or more blank pages in image data obtained by reading an input original document, wherein the input original document includes a plurality of pages;
determining a page position of the one or more blank pages in the image data;
designating an insertion position of one or more insertion sheets in a print output obtained by printing out the image data, wherein the insertion sheets are not included in the image data obtained by reading the input original document;
determining, when it is instructed to perform blank-sheet skip printing, in which printing is performed while skipping the one or more pages detected as blank from the image data, whether a position of the one or more pages detected as blank is before the insertion position of the one or more insertion sheets instructed to be inserted or not; and
keeping, when it is determined that the position of the one or more pages detected as blank is before the insertion position of the insertion sheets instructed to be inserted, a relative insertion position of the insertion sheets instructed to be inserted to a position of a preceding page corresponding to the number of the blank pages that are determined to be before the insertion position of the insertion sheets, said keeping being performed by decrementing a page number of the insertion sheets,
wherein, when it is not determined that the position of the one or more pages detected as a blank is before the insertion position of the insertion sheets instructed to be inserted, the page number of the insertion sheets instructed to be inserted is not changed.

6. A non-transitory computer-readable storage medium storing computer-executable instructions that causes a computer to execute a control method, the control method comprising:

detecting one or more blank pages in image data obtained by reading an input original document, wherein the input original document includes a plurality of pages;

determining a page position of the one or more blank pages in the image data;

designating an insertion position of one or more insertion sheets in a print output obtained by printing out the image data, wherein the insertion sheets are not included in the image data obtained by reading the input original document;

determining, when it is instructed to perform blank-sheet skip printing, in which printing is performed while skipping the one or more pages detected as blank from the image data, whether a position of the one or more pages detected as blank is before the insertion position of the one or more insertion sheets instructed to be inserted or not; and keeping, when it is determined that the position of the one or more pages detected as blank is before the insertion position of the insertion sheets instructed to be inserted, a relative insertion position of the insertion sheets instructed to be inserted to a position of a preceding page corresponding to the number of the blank pages that are determined to be before the insertion position of the insertion sheets, said keeping being performed by decrementing a page number of the insertion sheets, wherein, when it is not determined that the position of the one or more pages detected as a blank is before the insertion position of the insertion sheets instructed to be inserted, the page number of the insertion sheets instructed to be inserted is not changed.

\* \* \* \* \*